(12) United States Patent
Lu et al.

(10) Patent No.: US 9,713,042 B2
(45) Date of Patent: Jul. 18, 2017

(54) METHOD AND SYSTEM FOR NOTIFYING ATTRIBUTE OF IP ADDRESS AND SGW

(75) Inventors: Fei Lu, Shenzhen (CN); Gang Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 32 days.

(21) Appl. No.: 14/233,808

(22) PCT Filed: Jun. 13, 2012

(86) PCT No.: PCT/CN2012/076824
§ 371 (c)(1),
(2), (4) Date: Jan. 20, 2014

(87) PCT Pub. No.: WO2013/010415
PCT Pub. Date: Jan. 24, 2013

(65) Prior Publication Data
US 2014/0153544 A1    Jun. 5, 2014

(30) Foreign Application Priority Data
Jul. 21, 2011    (CN) .......................... 2011 1 0205561

(51) Int. Cl.
*H04W 36/00* (2009.01)
*H04W 8/26* (2009.01)
(Continued)

(52) U.S. Cl.
CPC ..... *H04W 36/0055* (2013.01); *H04L 12/1407* (2013.01); *H04L 61/2076* (2013.01);
(Continued)

(58) Field of Classification Search
CPC ................................................ H04W 36/0055
(Continued)

(56) References Cited

U.S. PATENT DOCUMENTS 7,336,941 B1 * 2/2008 Clingerman ............ H04L 12/14
                                                        455/404.1
2003/0112782 A1 * 6/2003 Mizell et al. .................. 370/338
(Continued)

FOREIGN PATENT DOCUMENTS

CN    101330425 A    12/2008
CN    101388901 A    3/2009
(Continued)

OTHER PUBLICATIONS

Supplementary European Search Report in European application No. 12814512.5, mailed on Mar. 27, 2015.
(Continued)

*Primary Examiner* — Melvin Marcelo
*Assistant Examiner* — Peter G Solinsky
(74) *Attorney, Agent, or Firm* — Oppedahl Patent Law Firm LLC

(57) ABSTRACT

A method and a system for notifying an attribute of an Internet Protocol (IP) address and a Serving Gateway (SGW) are disclosed. When an SGW is taken as a User Equipment's (UE's) SGW, the new SGW can be notified of an attribute of the UE's IP address. The technology of notifying an attribute of an IP address in the disclosure can ensure that the new SGW can learn the attribute of the UE's IP address in time when the new SGW is taken as the UE's SGW. Therefore, a charging gateway function entity connected with the new SGW can accurately charge the UE according to the attribute of the IP address.

15 Claims, 9 Drawing Sheets

(51) Int. Cl.
*H04W 4/24* (2009.01)
*H04L 12/14* (2006.01)
*H04L 29/12* (2006.01)
*H04M 15/00* (2006.01)
*H04W 88/16* (2009.01)
*H04W 36/12* (2009.01)

(52) U.S. Cl.
CPC ........... *H04M 15/83* (2013.01); *H04M 15/84* (2013.01); *H04M 15/85* (2013.01); *H04W 4/24* (2013.01); *H04W 8/26* (2013.01); *H04L 12/1425* (2013.01); *H04L 61/2007* (2013.01); *H04W 36/0011* (2013.01); *H04W 36/12* (2013.01); *H04W 88/16* (2013.01)

(58) Field of Classification Search
USPC ......................................................... 370/331
See application file for complete search history.

(56) References Cited

U.S. PATENT DOCUMENTS

2003/0221016 A1* 11/2003 Jouppi et al. ................. 709/245
2004/0243720 A1* 12/2004 Haumont et al. ............. 709/245
2006/0047800 A1* 3/2006 Caveney et al. .............. 709/223
2009/0052409 A1* 2/2009 Chen ................. H04L 29/12009
370/338
2010/0067509 A1* 3/2010 Lambert ........... H04L 29/12216
370/338
2010/0202351 A1* 8/2010 Xi et al. ........................ 370/328
2010/0284366 A1* 11/2010 Zhu ............................... 370/331

FOREIGN PATENT DOCUMENTS

| CN | 101540719 A | 9/2009 |
| CN | 101582777 A | 11/2009 |
| EP | 2192728 A1 | 6/2010 |

OTHER PUBLICATIONS

3GPP TS 23.401 v10.4.0, Jun. 2011.
3GPP TS 29.274 v10.3.0, Jun. 2011.
International Search Report in international application No. PCT/CN2012/076824, mailed on Sep. 27, 2012. (2 pages—see entire document).
English Translation of the Written Opinion of the International Search Authority in international application No. PCT/CN2012/076824, mailed on Sep. 27, 2012. (9 pages—see entire document).

* cited by examiner

METHOD AND SYSTEM FOR NOTIFYING ATTRIBUTE OF IP ADDRESS AND SGW

TECHNICAL FIELD

The disclosure relates to the field of communications, and in particular to a method and a system for notifying an attribute of an Internet Protocol (IP) address and a Serving Gateway (SGW).

BACKGROUND

With the emerging of World Interoperability for Microwave Access (WiMax), a third-generation mobile communication system must improve network performance and reduce costs of network construction and operation in order to keep strong competitiveness in the field of mobile communications. Therefore, a standardization working team of a 3rd Generation Partnership Project (3GPP) is committed to studying the evolution of a Packet Switch Core (PS Core) network and a Universal Mobile Telecommunication System Radio Access Network (UTRAN) at present. The subject of the study is referred to as System Architecture Evolution (SAE), and the purpose of the study is to enable an Evolved Packet Core (EPC) network to provide a higher transmission rate and shorter transmission delay, optimize grouping and support mobility management among an Evolved UTRAN (E-UTRAN), a Universal Terrestrial Radio Access Network (UTRAN), a Wireless Local Area Network (WLAN) and other non-3GPP access networks.

At present, the architecture of SAE, as shown in FIG. 1, includes the following network elements: an Evolved Radio Access Network (E-RAN), a Packet Data Network (PDN), an E-Packet Core (EPC) network, a Mobility Management Entity (MME), an SGW, a PDN Gateway (PGW), a Policy and Charging Rules Function (PCRF) entity, a Home Subscriber Server (HSS), and a Charging Gateway Function (CGF) entity.

The E-RAN can provide a higher uplink/downlink rate, lower transmission delay and more reliable radio transmission. A network element contained in the E-RAN is an Evolved NodeB (eNodeB), which is used to provide radio resources for the access of User Equipment (UE).

The PDN is used for providing services to a UE.

The EPC network provides lower delay and allows the access of more radio access systems, and the EPC network contains following network elements:

The MME, which is a control plane function entity, serves as a server for temporarily storing user data, and is responsible for managing and storing context of UE (for example, a UE/user identifier, a mobility management state, a user safety parameter), allocating a temporary identifier to a UE and authenticating a UE when the UE stays in a tracking area or the network, processing all non-access stratum messages between the MME and the UE, and triggering the paging of SAE. The MME is the mobile management unit of the SAE system. In a Universal Mobile Telecommunications System (UMTS), the mobile management unit is a Serving General Packet Radio Service (GPRS) Support Node (SGSN).

The SGW, which is a user plane entity, is responsible for processing routing of user plane data, terminating downlink data of a UE in an idle (ECM_IDLE) state, and managing and storing SAE bearer context of a UE, such as IP bearer service parameter and internal network routing information. The SGW is an anchor point of user plane in 3GPP system and one UE has one SGW only at a time.

The PGW is responsible for a UE to access a PDN and allocates an IP address to the UE, and also is a mobility anchor point of 3GPP and non-3GPP access systems. The functions of the PGW further include policy enforcement and charging support. A user can access a plurality of PGWs at the same time. A Policy and Charging Enforcement Function (PCEF) entity also is located in the PGW.

The PCRF entity is responsible for providing policy control and charging rules to the PCEF.

The HSS permanently stores UE's subscription data. Contents stored in the HSS include International Mobile Subscriber Identification (IMSI) of a UE and an IP address of the PGW.

The CGF entity is responsible for collecting charging data of a user.

Physically, the SGW and the PGW can be merged into a whole entity. In the EPC system, the user plane network element includes the SGW and the PGW.

In the EPC system, the network may allocate a dynamic IP address to the UE or allocate a static IP address to the UE. As shown in FIG. 2, UE attach and the allocation of a static IP address during the attach procedure include the following steps:

Step 201: A UE sends an attach request message to an eNodeB, and the attach request message includes IMSI, UE network capability and other parameters.

Step 202: The eNodeB selects an MME for the UE and forwards the attach request message to the MME.

Step 203: The MME sends a location update request message to an HSS, and the location update request message includes an update type and an MME address.

Step 204: The HSS returns a location update response message to the MME, and the location update response message includes user data and the user data include an Access Point Name (APN), default bearer Quality of Service (QoS) and a corresponding static IP address.

Step 205: The MME selects an SGW for the UE according to location information of the UE, and sends a session establishment request message to the selected SGW. The session establishment request message includes an IP address and a Tunnel Endpoint Identifier (TEID) of the MME, a control plane IP address of the PGW, default bearer QoS, an EPS bearer ID, a static IP address etc.

Step 206: The SGW sends a session establishment request message to a PGW, and the session establishment request message includes an control plane IP address and a TEID of the SGW, a user plane IP address and a TEID of the SGW, the control plane IP address of the PGW, the default bearer QoS, the EPS bearer ID, the static IP address etc.

Step 207: The PGW returns a session establishment response message to the SGW, and the session establishment response message includes an IP address and a TEID of the PGW for the control plane, an IP address and a TEID of the PGW for user plane, bearer QoS and an IP address.

Step 208: The SGW returns a session establishment response message to the MME, and the session establishment response message includes the IP address and the TEID of the PGW for the control plane, the IP address and the TEID of the PGW for the user plane, IP address and the TEID of the SGW for the user plane, the bearer QoS, IP address of the UE etc.

Step 209: The MME sends an initial context establishment request message to the eNodeB, and the initial context establishment request message includes the IP address and the TEID of the SGW for the user plane, the bearer QoS, the EPS bearer ID, and an attach accept message. The attach accept message includes the APN, an IP address of the UE, Globally Unique Temporary Identity (GUTI), a Tracking Area Identity (TAI) list etc.

Step 210: The eNodeB sends a Radio Resource Connection (RRC) reconfiguration message to the UE and sends the attach accept message to the UE. The RRC reconfiguration message includes an EPS radio bearer ID.

Step 211: The UE sends a RRC configuration complete message to the eNodeB.

Step 212: The eNodeB sends an initial context establishment response message to the MME, and the initial context establishment response message includes an IP address and a TEID of the eNodeB for the user plane.

Step 213: The UE sends a direct transfer message to the eNodeB, and the direct transfer message includes an attach complete message.

Step 214: The eNodeB sends the attach complete message to the MME.

Step 215: The MME sends a bearer modification request message to the SGW, and the bearer modification request message includes the IP address and the TEID of the eNodeB for the user plane, and the EPS bearer ID.

Step 216: The SGW returns a bearer modification response message to the MME.

From the above descriptions, it can be seen that, when the new SGW is taken as the UE's SGW, a new SGW cannot learn the attribute of the UE's IP address in time. Therefore, a CGF entity connected with the new SGW cannot accurately charge the UE according to the attribute of the IP address.

SUMMARY

In view of the above, the disclosure is intended to provide a method and a system for notifying an attribute of an IP address and an SGW, so as to ensure that a new SGW can learn the attribute of a UE's IP address in time when an SGW is taken as the UE's SGW.

To this end, a technical solution of the disclosure is implemented as follows.

A method for notifying an attribute of an IP address includes:

when an SGW is taken as a UE's SGW, the new SGW is notified of an attribute of the UE's IP address.

The notifying can include at least one of the following:

a mobility management unit passes the attribute of the UE's IP address to the new SGW in a session establishment request message; or a PGW passes the attribute of the UE's IP address to the new SGW, after the UE moves and the new SGW is taken as the UE's SGW.

In the case that the attribute of the UE's IP address is passed to the new SGW by the mobility management unit in the session establishment request message, the method may further include that: the mobility management unit acquires the attribute of the IP address during at least one of an attach procedure, a UE-requested Packet Data Network (PDN) connection establishment procedure, and a Packet Data Protocol (PDP) context activation procedure; and in the case that the attribute of the UE's IP address is passed to the new SGW by the PGW, the PGW passes the attribute of the IP address in a bearer modification response message.

In the case that the attribute of the UE's IP address is passed to the new SGW by the mobility management unit in the session establishment request message, the method may further include that: the PGW passes the attribute of the IP address to the mobility management unit via the new SGW in a session establishment response message; and when the UE moves to a coverage area of a new mobility management unit, the UE's original mobility management unit passes the attribute of the IP address to the new mobility management unit during a context pass procedure; and in the case that the attribute of the UE's IP address is passed to the new SGW by the PGW, the method may further include that: the PGW stores the attribute of the IP address in a PGW context during at least one of an attach procedure, a UE-requested PDN connection establishment procedure, and a PDP context activation procedure.

The attribute of the UE's IP address may include a dynamic-IP-address attribute and a static-IP-address attribute.

The mobility management unit may be an MME or an SGSN.

The method may further include:

a CGF entity connected with the SGW charges the UE according to the attribute of the IP address.

A system for notifying an attribute of an IP address includes an SGW confirmation unit and an IP address attribute notification unit, wherein the SGW confirmation unit is configured to confirm that a new SGW is taken as a UE's SGW, and notify the IP address attribute notification unit of the confirmed result; and the IP address attribute notification unit is configured to notify a new SGW of an attribute of the UE's IP address according to the notification of the SGW confirmation unit.

The IP address attribute notification unit may be configured to notify the new SGW of the attribute of the UE's IP address by at least one of the following:

controlling a mobility management unit to pass the attribute of the UE's IP address to the new SGW in a session establishment request message; or controlling a PGW to pass the attribute of the UE's IP address to the new SGW, after the UE moves and the new SGW is taken as the UE's SGW.

In the case that the attribute of the UE's IP address is passed to the new SGW by the mobility management unit in the session establishment request message, the mobility management unit may be further configured to: acquire the attribute of the IP address during at least one of an attach procedure, a UE-requested PDN connection establishment procedure, and a PDP context activation procedure; and in the case that the attribute of the UE's IP address is passed to the new SGW by the PGW, the PGW may be configured to pass the attribute of the IP address in a bearer modification response message.

In the case that the attribute of the UE's IP address is passed to the new SGW by the mobility management unit in the session establishment request message, the PGW may be further configured to pass the attribute of the IP address to the mobility management unit via the new SGW in a session establishment response message; and when the UE moves to a coverage area of a new mobility management unit, the UE's original mobility management unit is configured to pass the attribute of the IP address to the new mobility management unit during a context pass procedure; and in the case that the attribute of the UE's IP address is passed to the new SGW by the PGW, the PGW may be further configured to store the attribute of the IP address in a PGW context during at least one of an attach procedure, a UE-requested PDN connection establishment procedure, and a PDP context activation procedure.

The system may further include a CGF entity connected with the SGW, wherein the CGF entity is configured to charge the UE according to the attribute of the IP address.

The attribute of the UE's IP address may include a dynamic-IP-address attribute and a static-IP-address attribute.

The mobility management unit may be an MME or an SGSN.

An SGW is configured to receive an attribute of a UE's IP address, wherein the SGW is one which is newly taken as the UE's SGW.

The attribute of the IP address may be passed by an IP address attribute notification unit; and the IP address attribute notification unit may be configured to notify the new SGW of the attribute of the IP address by at least one of the following:

controlling a mobility management unit to pass the attribute of the UE's IP address to the new SGW in a session establishment request message; and controlling a PGW to pass the attribute of the UE's IP address to the new SGW, after the UE moves and the new SGW is taken as the UE's SGW.

In the case that the attribute of the UE's IP address is passed to the new SGW by the mobility management unit in the session establishment request message, the mobility management unit may be further configured to: acquire the attribute of the IP address during at least one of an attach procedure, a UE-requested PDN connection establishment procedure, and a PDP context activation procedure; and in the case that the attribute of the UE's IP address is passed to the new SGW by the PGW, the PGW may be configured to pass the attribute of the IP address in a bearer modification response message.

In the case that the attribute of the UE's IP address is passed to the new SGW by the mobility management unit in the session establishment request message, the PGW may be further configured to pass the attribute of the IP address to the mobility management unit via the new SGW in a session establishment response message; and when the UE moves to a coverage area of a new mobility management unit, the mobility management unit is configured to pass the attribute of the IP address to the new mobility management unit during a context pass procedure; and in the case that the attribute of the UE's IP address is passed to the new SGW by the PGW, the PGW is further configured to store the attribute of the IP address in a PGW context during at least one of an attach procedure, a UE-requested PDN connection establishment procedure, and a PDP context activation procedure.

The SGW may be connected with a CGF entity, and the CGF entity may be configured to charge the UE according to the attribute of the IP address.

The attribute of the UE's IP address may include a dynamic-IP-address attribute and a static-IP-address attribute.

The mobility management unit may be an MME or an SGSN.

The technology of notifying an attribute of an IP address in the disclosure can ensure that a new SGW can learn the attribute of the UE's IP address in time when the new SGW is taken as the UE's SGW. Therefore, a CGF entity connected with the new SGW can accurately charge the UE according to the attribute of the IP address.

DETAILED DESCRIPTION

During an actual application, a mobility management unit can send an attribute of an UE's IP address to an SGW in a session establishment request message, so that a CGF entity connected with the SGW can charge the UE accurately according to the attribute of the IP address.

It should be noted that the mobility management unit can acquire the attribute of the IP address during a procedure such as an attach procedure, a UE-requested PDN connection establishment procedure or a PDP context activation procedure.

Further, the PGW can pass the attribute of the IP address to the mobility management unit via the new SGW in a session establishment response message. When the UE moves to the coverage area of a new mobility management unit, the UE's original mobility management unit passes the attribute of the IP address to the new mobility management unit during a context pass procedure. If the new mobility management unit determines that the SGW needs to be changed, then the new mobility management unit can include the attribute of the IP address in a session establishment request message to be sent to the new SGW.

In addition, after the UE moves and the new SGW is taken as the UE's SGW, the PGW can also pass the attribute of the UE's IP address to the new SGW.

It should be noted that the PGW can pass the attribute of the IP address in a bearer modification response message. Furthermore, the PGW can store the attribute of the IP address in a PGW context during a process such as an attach procedure, a UE-requested PDN connection establishment procedure or a PDP context activation procedure.

Preferred embodiments of the disclosure are described below with reference to the drawings. It should be understood that the preferred embodiments described here are merely used to describe and illustrate the disclosure instead of limiting this disclosure.

Figure 1:
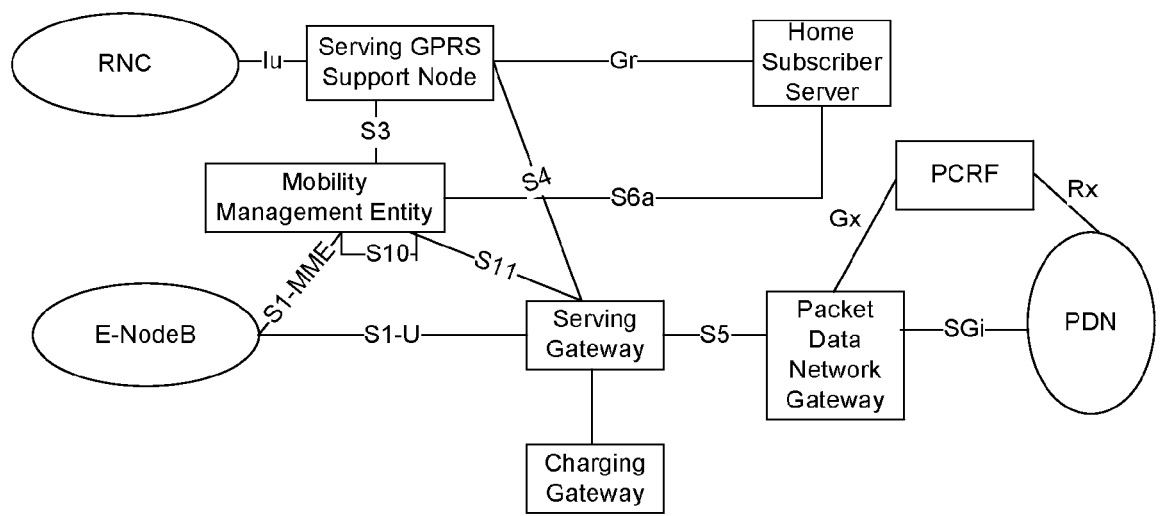
FIG. 1 shows a structure diagram of an evolved packet network system in the related art.
Figure 2:
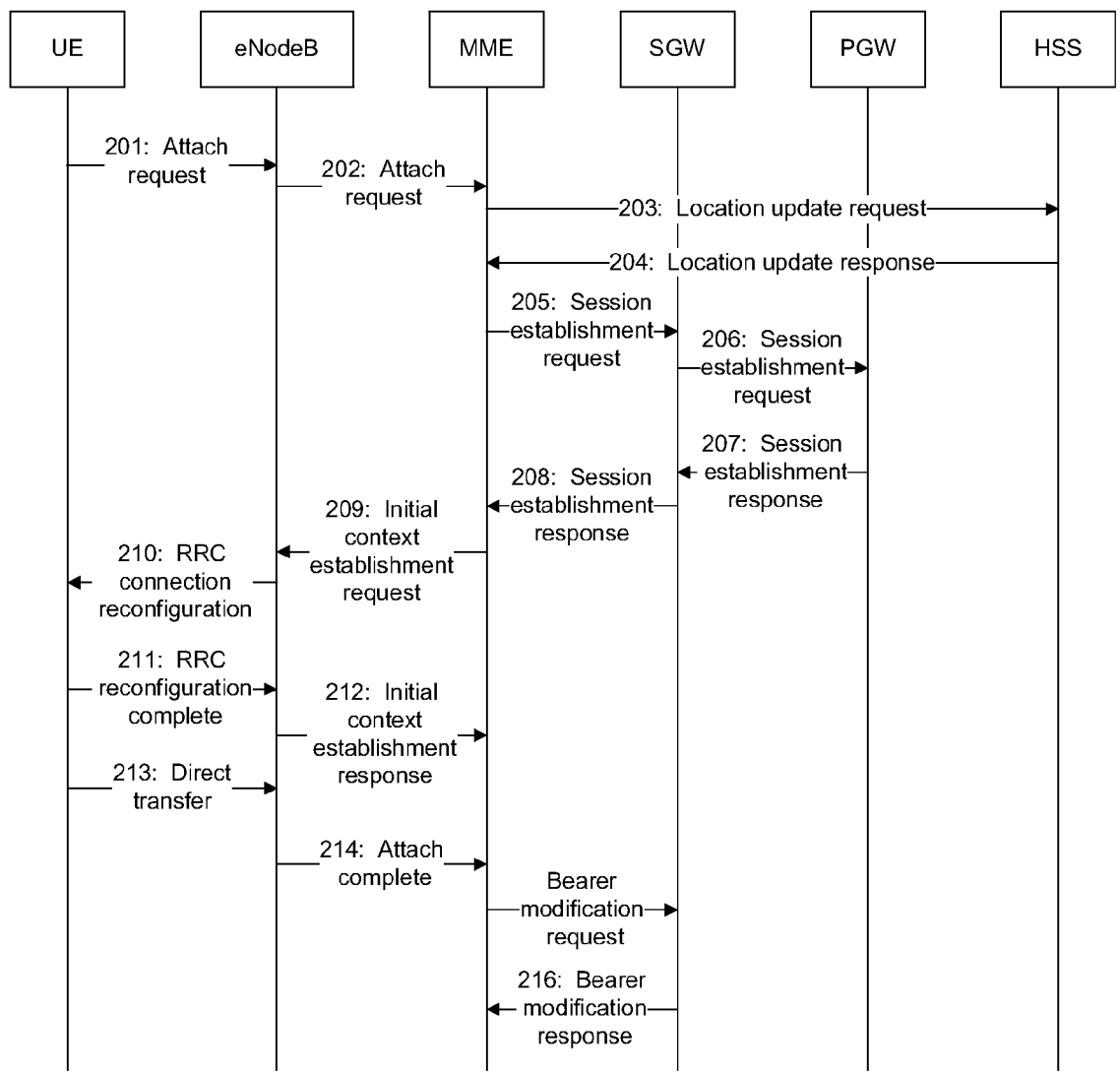
FIG. 2 shows a signalling flowchart of static IP address allocation in the related art.
Figure 3:
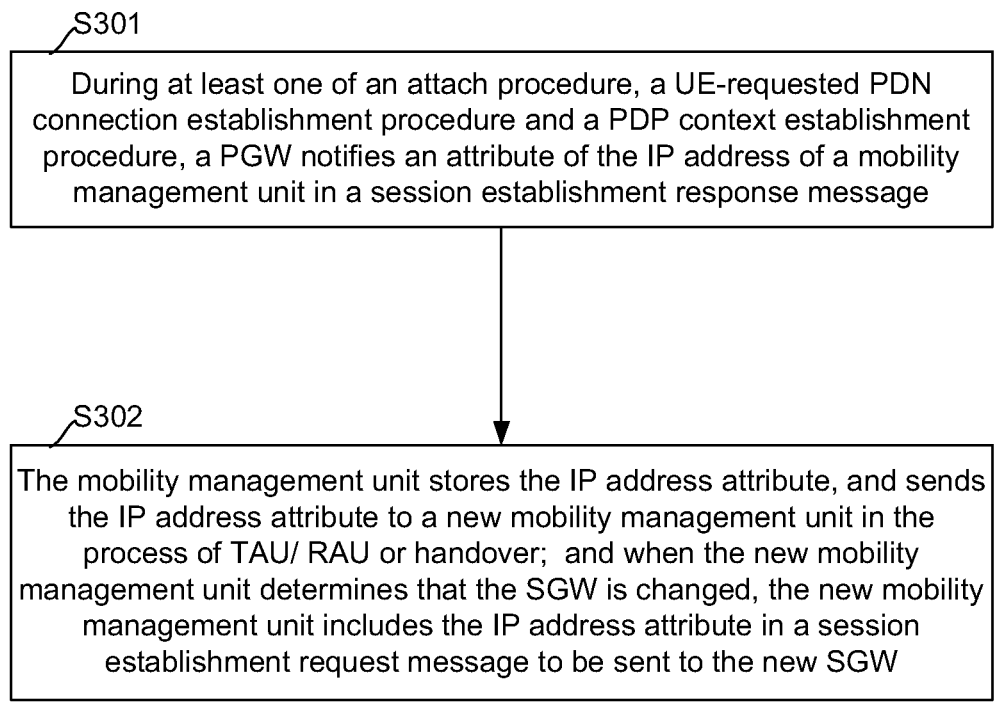
FIG. 3 shows a flowchart of notifying an attribute of an IP address according to Embodiment 1 of the disclosure.

Referring to FIG. 3, it shows a flowchart of notifying an attribute of an IP address according to Embodiment 1 of the disclosure. The flow includes the following steps:

Step 301: During at least one of an attach procedure, a UE-requested PDN connection establishment procedure and a PDP context establishment procedure, a PGW notifies an attribute of an IP address of a mobility management unit in a session establishment response message. The attribute of the IP address may include a static-IP-address attribute and a dynamic-IP-address attribute, which can be identified by a label. The label may be represented by a separate Information Element (IE). Specifically, in the IE, "1" can be used to indicate the dynamic-IP-address attribute and "0" can be used to indicate the static-IP-address attribute.

Step 302: The mobility management unit stores the received IP address attribute, and passes the attribute of the IP address to a new mobility management unit in the process of TAU/Routing Area Update (RAU) or handover. In this way, when the new mobility management unit determines that the new SGW is taken as the UE's SGW, the attribute of the IP address needs to be included in a session establishment request message to be sent to the new SGW from the new mobility management unit.

Figure 4:
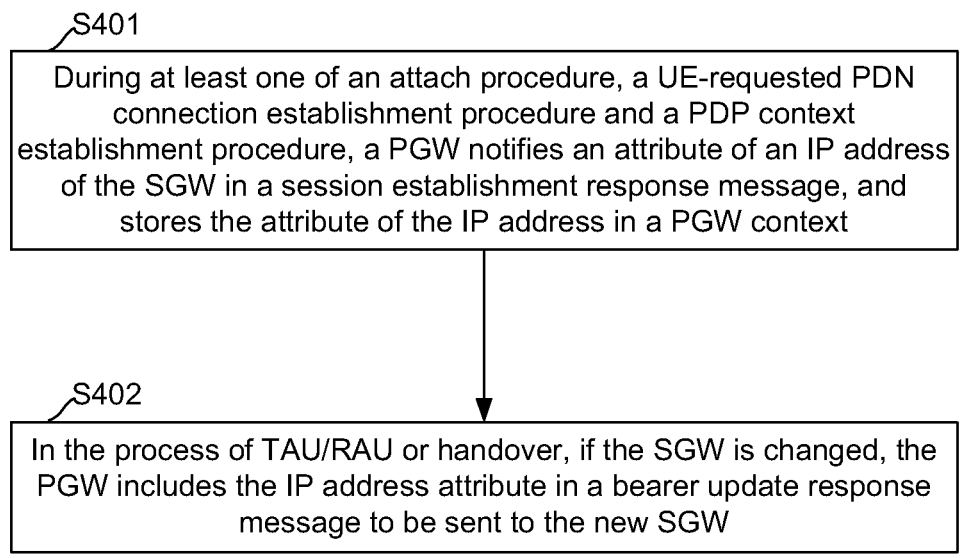
FIG. 4 shows a flowchart of notifying an attribute of an IP address according to Embodiment 2 of the disclosure.

Referring to FIG. 4, it shows a flowchart of notifying an attribute of an IP address according to Embodiment 2 of the disclosure. The flow includes the following steps:

Step 401: During at least one of an attach procedure, a UE-requested PDN connection establishment procedure and a PDP context establishment procedure, a PGW notifies an attribute of an IP address of the SGW in a session establishment response message, and stores the attribute of the IP address in a PGW context.

Step 402: In the process of TAU/RAU or handover, if a new SGW is taken as the UE's SGW, the PGW includes the attribute of the IP address in a bearer update response message to be sent to the new SGW.

Figure 5:
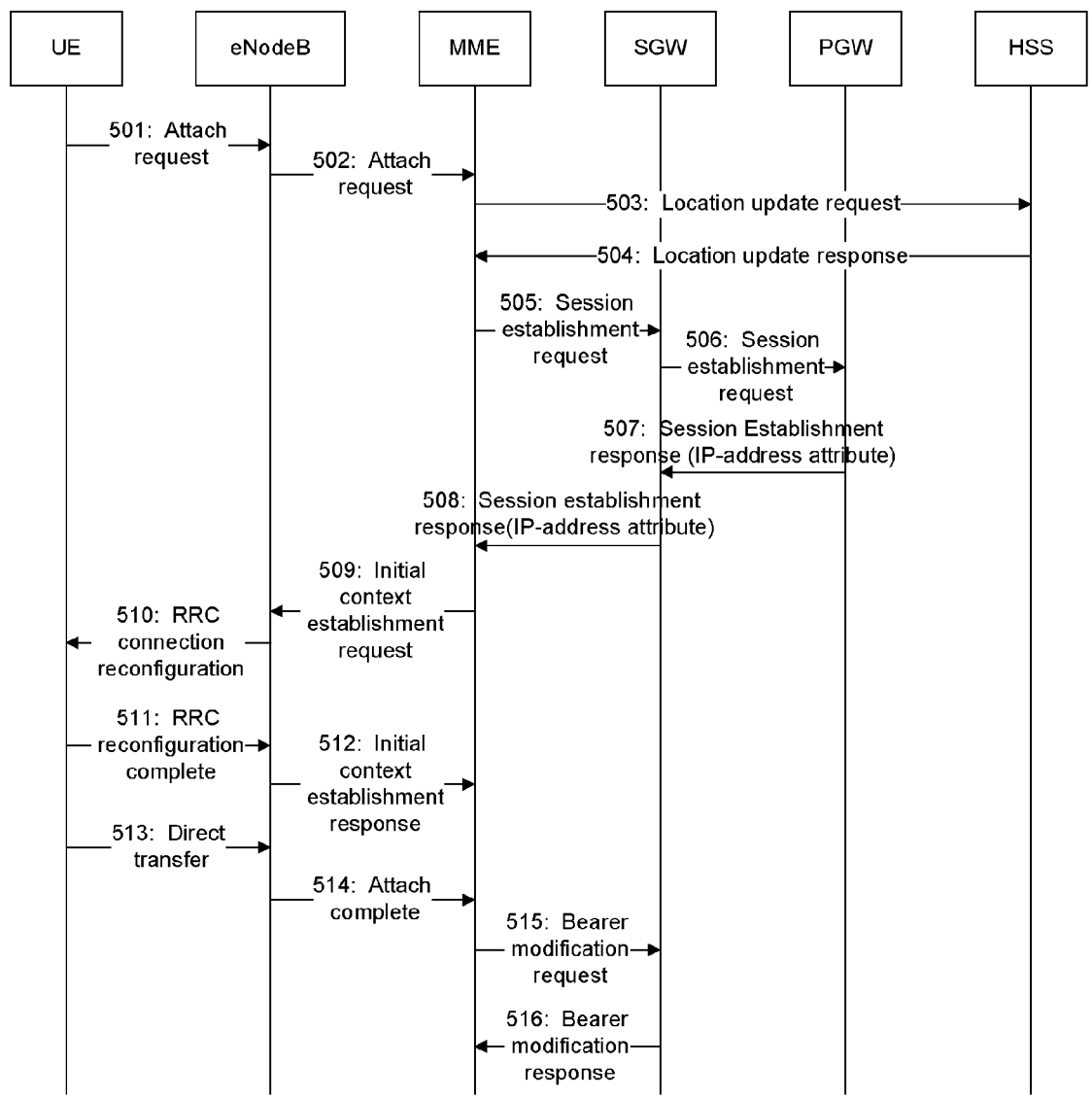
FIG. 5 shows a flowchart of acquiring an attribute of an IP address by an SGW during an attach procedure according to Embodiment 1 of the disclosure.

Referring to FIG. 5, it shows a flowchart of acquiring an attribute of an IP address by an SGW during an attach procedure according to Embodiment 1 of the disclosure. The flow includes the following steps:

Step 501: A UE sends an attach request message to an eNodeB, and the attach request message includes IMSI, UE network capability and other parameters.

Step 502: The eNodeB selects an MME for the UE and forwards the attach request message to the MME.

Step 503: The MME sends a location update request message to an HSS, and the location update request message includes an update type and an MME address.

Step 504: The HSS returns a location update response message including subscription data to the MME, and the subscription data include an APN, default bearer QoS and a corresponding static IP address.

Step 505: The MME selects an SGW for the UE according to location information of the UE, and sends a session establishment request message to the selected SGW. The session establishment request message includes an IP address and a TEID of the MME, a control plane IP address of a PGW, default bearer QoS and an EPS bearer ID. If the corresponding static IP address is acquired in Step 504, then the static IP address can also be included in the session establishment request message in Step 505.

Step 506: The SGW sends a session establishment request message to a PGW, and the session establishment request message includes an IP address and a TEID of the SGW for the control plane, the IP address and the TEID of the SGW for the user plane, the control plane IP address of the PGW, the default bearer QoS and the EPS bearer ID. If the corresponding static IP address is acquired in Step 504, then the static IP address can also be included in the session establishment request message in Step 506.

Step 507: The PGW returns a session establishment response message to the SGW, and the session establishment response message includes an IP address and a TEID of the PGW for the control plane, an IP address and a TEID of the PGW for the user plane, bearer QoS and an IP address of the UE. An attribute of the IP address also needs to be included in the session establishment response message. The attribute of the IP address may include a static-IP-address attribute and a dynamic-IP-address attribute, which can be identified by a label. The label may be represented by a separate IE. Specifically, in the IE, "1" can be used to indicate the dynamic-IP-address attribute and "0" can be used to indicate the static-IP-address attribute.

Step 508: The SGW returns a session establishment response message to the MME, and the session establishment response message includes the IP address and the TEID of the PGW for the control plane, the IP address and the TEID of the PGW for the user plane, an IP address and a TEID of the SGW for the user plane, the bearer QoS, IP address of the UE etc. The attribute of the IP address also needs to be included in the session establishment response message.

Step 509: The MME sends an initial context establishment request message to the eNodeB, and the initial context establishment request message includes the IP address and the TEID of the SGW for the user plane, the bearer QoS and the EPS bearer ID, and includes an attach accept message. The attach accept message includes an APN, a user IP address, GUTI, a TAI list etc.

Step 510: The eNodeB sends a RRC reconfiguration message including an EPS radio bearer ID to the UE, and sends the attach accept message to the UE.

Step 511: The UE sends a RRC configuration complete message to the eNodeB.

Step 512: The eNodeB sends an initial context establishment response message to the MME, and the initial context establishment response message includes an IP address and a TEID of the eNodeB for the user plane.

Step 513: The UE sends a direct transfer message to the eNodeB, and the direct transfer message includes an attach complete message.

Step 514: The eNodeB sends the attach complete message to the MME.

Step 515: The MME sends a bearer modification request message to the SGW, and the bearer modification request message includes the IP address and the TEID of the eNodeB for the user plane, and the EPS bearer ID.

Step 516: The SGW returns a bearer modification response message to the MME.

The embodiment is illustrated by taking the attach procedure as an example. The processing mode of the procedure of UE requested a PDN connectivity establishment or the PDP context establishment procedure is similar to the embodiment, which is not repeated here.

Figure 6:
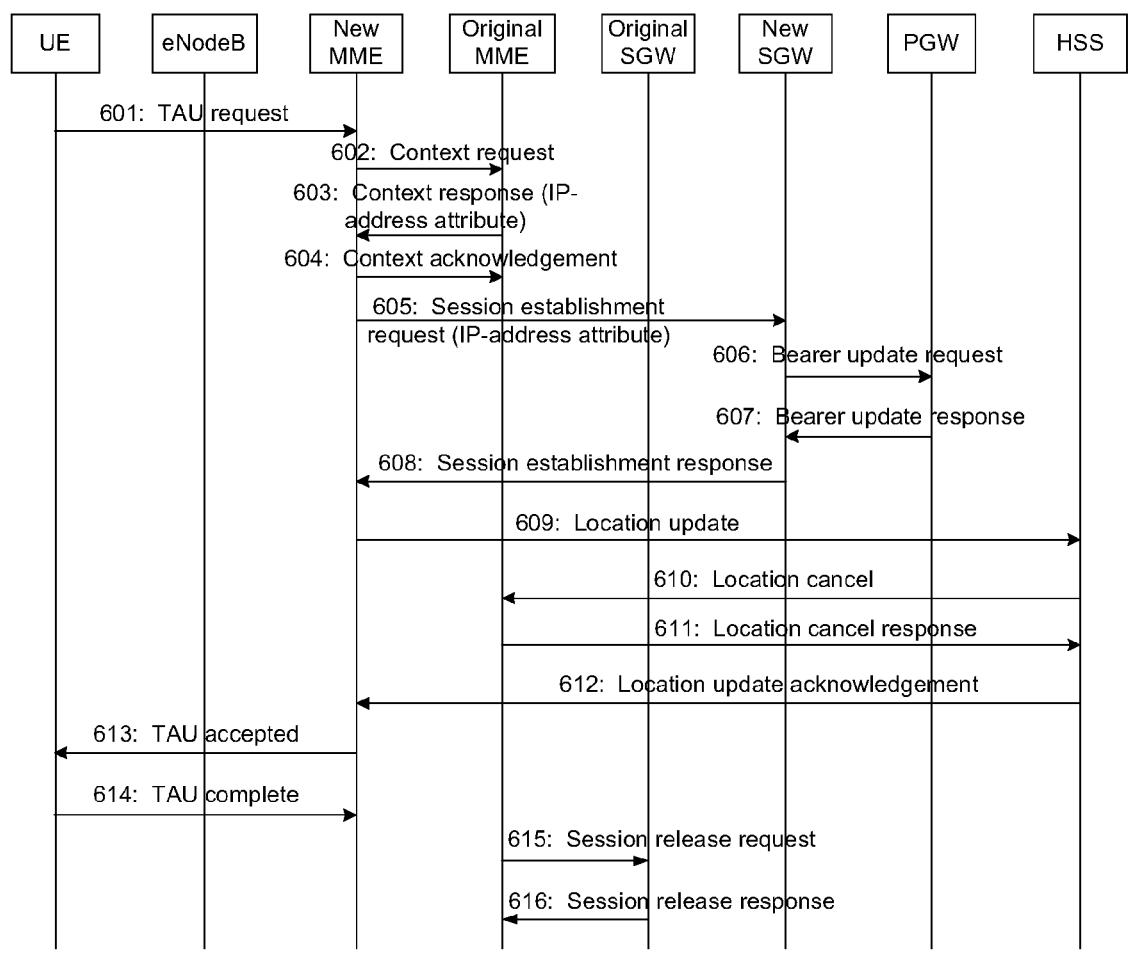
FIG. 6 shows a flowchart of experiencing Tracking Area Update (TAU) by a UE when a UE moves to a new MME according to Embodiment 1 of the disclosure.

Referring to FIG. 6, it shows a flowchart of experiencing TAU by a UE when the UE moves to a new MME according to Embodiment 1 of the disclosure. The flow includes the following steps:

Step 601: A UE moves to an E-UTRAN coverage area of a new MME. Besides the GUTI of the UE allocated under an original MME, the UE needs to include its capability information in a TAU request message to be passed to the MME.

Step 602: The new MME finds the original MME according to the received GUTI, and sends context request signalling to the original MME to acquire context.

Step 603: The original MME transfers mobility management contexts and bearer contexts of a UE to the new MME, and includes an attribute of the IP address in a returned context response message.

Step 604: The new MME returns a context acknowledgement message to the original MME.

Step 605: The new MME initiates a session establishment request message to a new SGW, and the session establishment request message includes a source General Packet Radio Service Tunneling Protocol-Control Plane (GTP-C) TEID (Tunnel End Identifier) and a destination GTP-CTEID, an address and a TEID of the SGW for the control plane and location information of the UE, and the message also needs to include the attribute of the IP address.

Step 606: The new SGW sends a bearer update request message to the PGW, and the bearer update request message includes the location information of the UE.

Step 607: The PGW updates its own context and returns a bearer update response message to the new SGW.

Step 608: The new SGW returns a session establishment response to the new MME, to send the new MME the destination GTP-C TEID allocated by the new SGW, the address of the new SGW and the address and TEID of the PGW.

Step 609: The new MME notifies the HSS of location change through a location update message.

Step 610: The HSS sends location cancel signalling to the original MME.

Step 611: The original MME returns a location cancel response to the HSS.

Step 612: The HSS acknowledges the location update of the new MME, and sends user subscription data to the new MME.

Step 613: If the new MME confirms that the UE is valid in the current tracking area, the new MME sends a TAU (Tracking Area Update) accept message to the UE.

Step 614: If the new MME allocates a new GUTI to the UE through the TAU process, the UE returns a TAU complete message to the MME to acknowledge.

Step 615: The original MME session session release request message to the original SGW, to notify the original SGW to delete the bearer context of the UE.

Step 616: The original SGW returns a session release response message to the original MME.

The embodiment is illustrated by taking moving to the coverage area of a new MME by the UE as an example. The processing mode for the UE moving to a new SGSN is similar to the embodiment, which is not repeated here.

Figure 7:
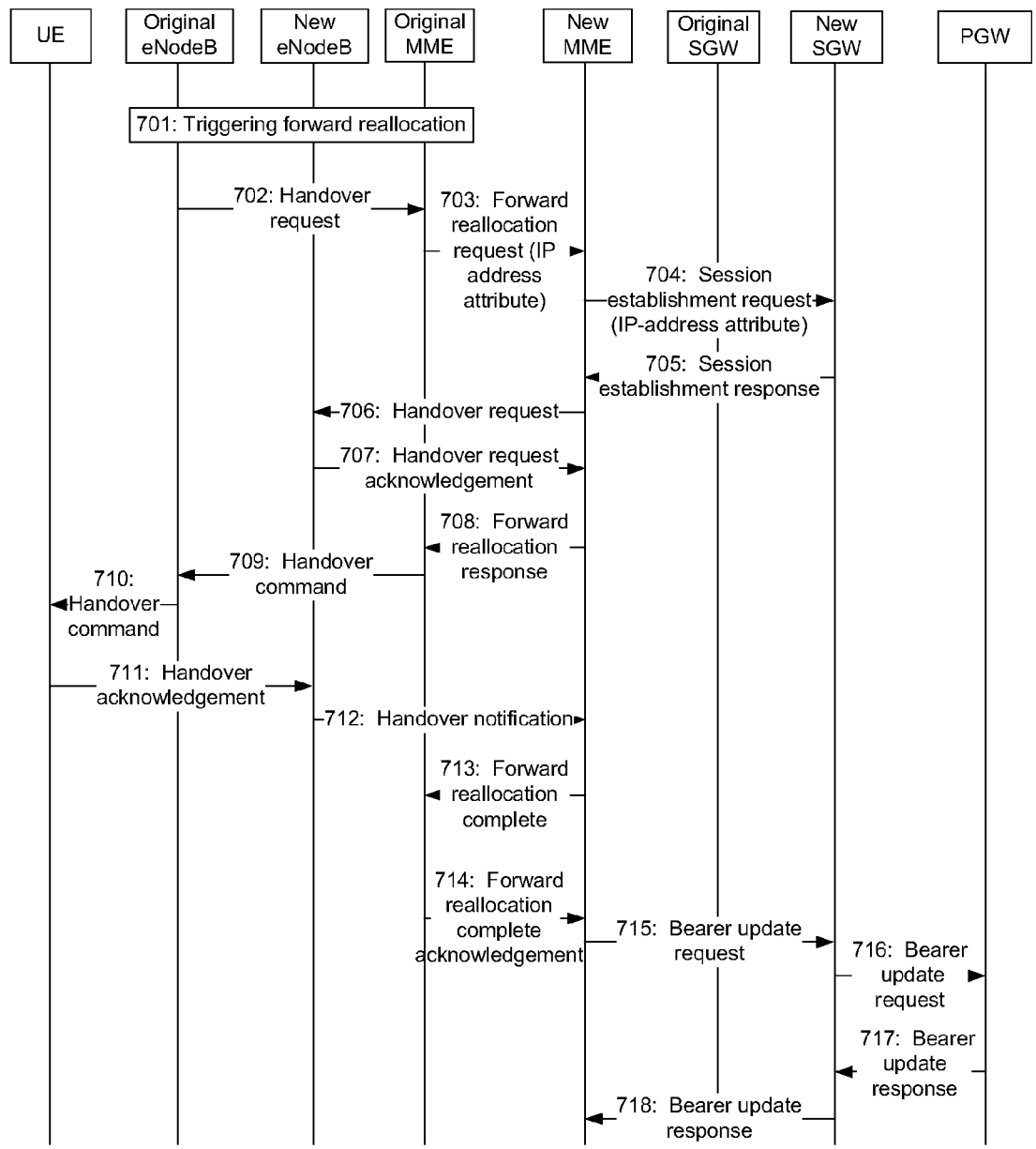
FIG. 7 shows a flowchart of experiencing handover and moving to a new MME by the UE according to Embodiment 1 of the disclosure.

Referring to FIG. 7, it shows a flowchart of experiencing handover and moving to a new MME by the UE according to Embodiment 1 of the disclosure. The flow includes the following steps:

Step 701: The original eNodeB decides to initiate handover between eNodeBs to a new eNodeB which results in the relocation of a core network node.

Step 702: The original eNodeB sends a handover request message to the original MME.

Step 703: The original MME selects a new MME according to an MME selection function, and sends a forward reallocation request message to the new MME. The forward reallocation request message includes an address and a TEID of a PGW for uplink, and an address and a TEID of an SGW for uplink, and includes an attribute of an IP address.

The attribute of the IP address may include a static-IP-address attribute and a dynamic-IP-address attribute, which can be identified by a label. The label may be represented by a separate IE. Specifically, in the IE, "1" can be used to indicate the dynamic-IP-address attribute and "0" can be used to indicate the static-IP-address attribute.

Step 704: The new MME sends a session establishment request message to the new SGW, and the session establishment request message includes a GTP-C TEID and an IP address of the PGW, bearer QoS etc, and needs to include the attribute of the IP address.

Step 705: The new SGW returns a session establishment response message to the MME, and the session establishment response message includes a GTP-C TEID and an address of the new SGW.

Step 706: The new MME sends a handover request message to the new eNodeB, to request establishment of UE context in the new eNodeB.

Step 707: The new eNodeB sends a handover request acknowledgement message to the new MME.

Step 708: The new MME sends a forward reallocation response message to the original MME.

Step 709: The original MME sends a handover command message to the original eNodeB.

Step 710: The original eNodeB forwards the handover command message to the UE.

Step 711: The UE sends a handover acknowledgement message to the new eNodeB after the UE is synchronized with a cell of the new eNodeB.

Step 712: The new eNodeB sends a handover notification message to the new MME.

Step 713: The new MME sends a forward reallocation complete message to the original MME.

Step 714: The original MME returns a forward reallocation complete acknowledgement message to the new MME.

Step 715: The new MME initiates a bearer update request message to the SGW, and the bearer update request message includes a TEID and an IP address of the new eNodeB for the user plane.

Step 716: The SGW sends a bearer update request message to the PGW, to send to the PGW the address information and TEID of the SGW, the location information of the UE and other parameters.

Step 717: The PGW updates its own context and returns a bearer update response message to the new SGW.

Step 718: The new SGW returns a bearer update response message to the new MME.

The embodiment is illustrated by taking moving to the coverage area of a new MME by the UE as an example. The processing mode for moving to a new SGSN by the UE is similar to the embodiment, which is not repeated here.

Figure 8:
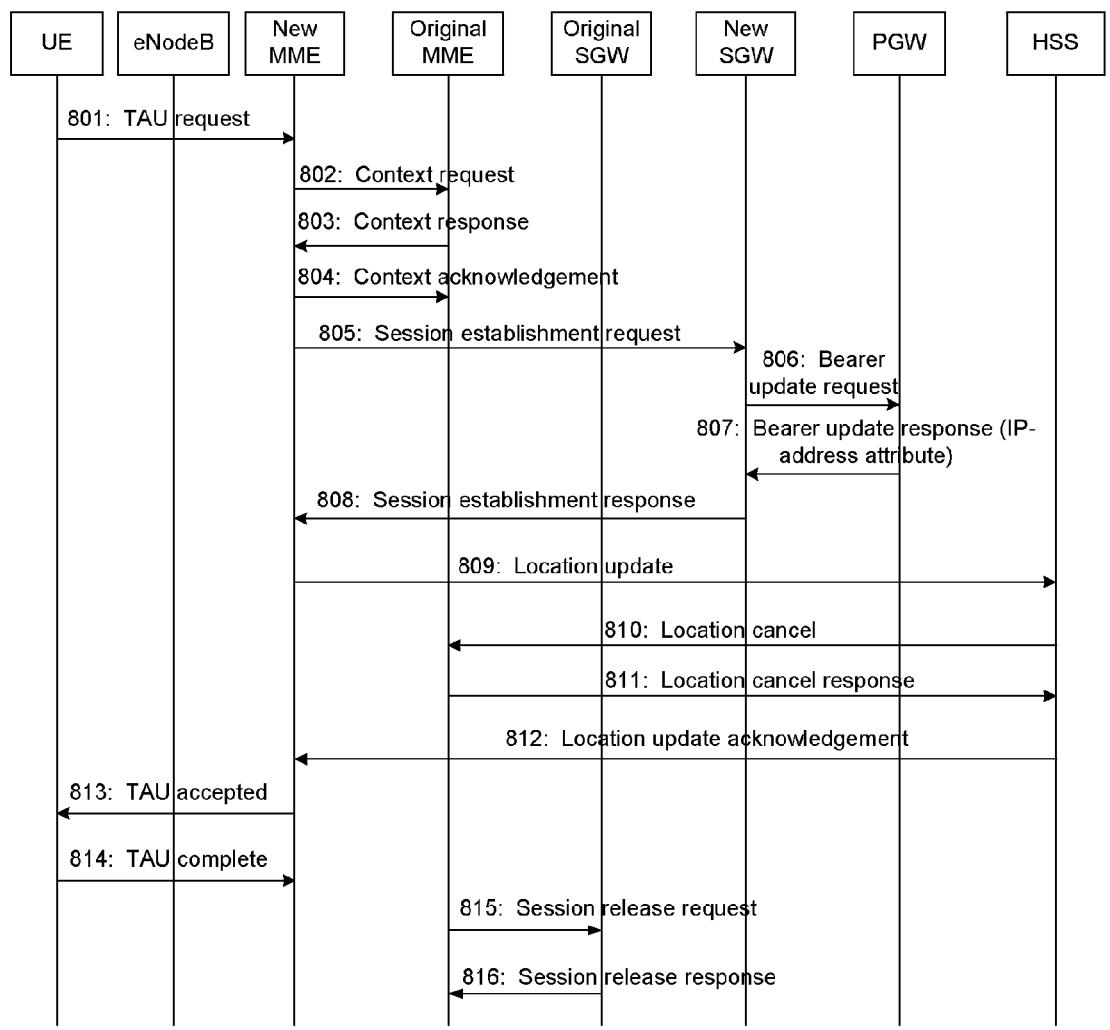
FIG. 8 shows a flowchart of moving to a new MME and experiencing TAU by a UE according to Embodiment 2 of the disclosure.

Referring to FIG. 8, it shows a flowchart of moving to a new MME and experiencing TAU by a UE according to Embodiment 2 of the disclosure. The flow includes the following steps:

Step 801: A UE moves to an E-UTRAN coverage area of a new MME. Besides the GUTI of the UE allocated under an original MME, the UE needs to include its capability information in a TAU request message to be sent to the MME.

Step 802: The new MME finds the original MME according to the received GUTI, and transfers context request signalling to the original MME to acquire context.

Step 803: The original MME sends mobility management context and bearer context of the UE to the new MME.

Step 804: The new MME returns a context acknowledgement message to the original MME.

Step 805: The new MME initiates a session establishment request message to a new SGW, and the session establishment request message includes a source GTP-C TEID and a destination GTP-C TEID, an address and TEID of SGW for the control plane and location information of the UE.

Step 806: The SGW sends a bearer update request message to the PGW, and the bearer update request message includes the location information of the UE.

Step 807: The PGW updates its own context and returns a bearer update response message to the new SGW, and the bearer update response message includes an attribute of an IP address.

Step 808: The new SGW returns a session establishment response to the new MME, to send to the MME the destination GTP-C TEID allocated by the new SGW, new address of the new SGW, and the address and TEID of the PGW.

Step 809: The new MME notifies the HSS of location change through a location update message.

Step 810: The HSS sends location cancel signalling to the original MME.

Step 811: The original MME returns a location cancel response to the HSS.

Step 812: The HSS acknowledges the location update of the new MME, and sends UE subscription data to the new MME.

Step 813: If the new MME confirms that the UE is valid in the current tracking area, the new MME sends a TAU accept message to the UE.

Step 814: If the new MME allocates a new GUTI to the UE through the TAU process, the UE returns a TAU complete message to the MME to acknowledge.

Step 815: The original MME sends a session release request message to the original SGW, to notify the original SGW to delete the bearer context of the UE.

Step 816: The original SGW returns a session release response message to the original MME.

The embodiment is illustrated by taking moving to the coverage area of a new MME by the UE as an example. The processing mode for the UE moving to a new SGSN is similar to the embodiment, which is not repeated here.

Figure 9:
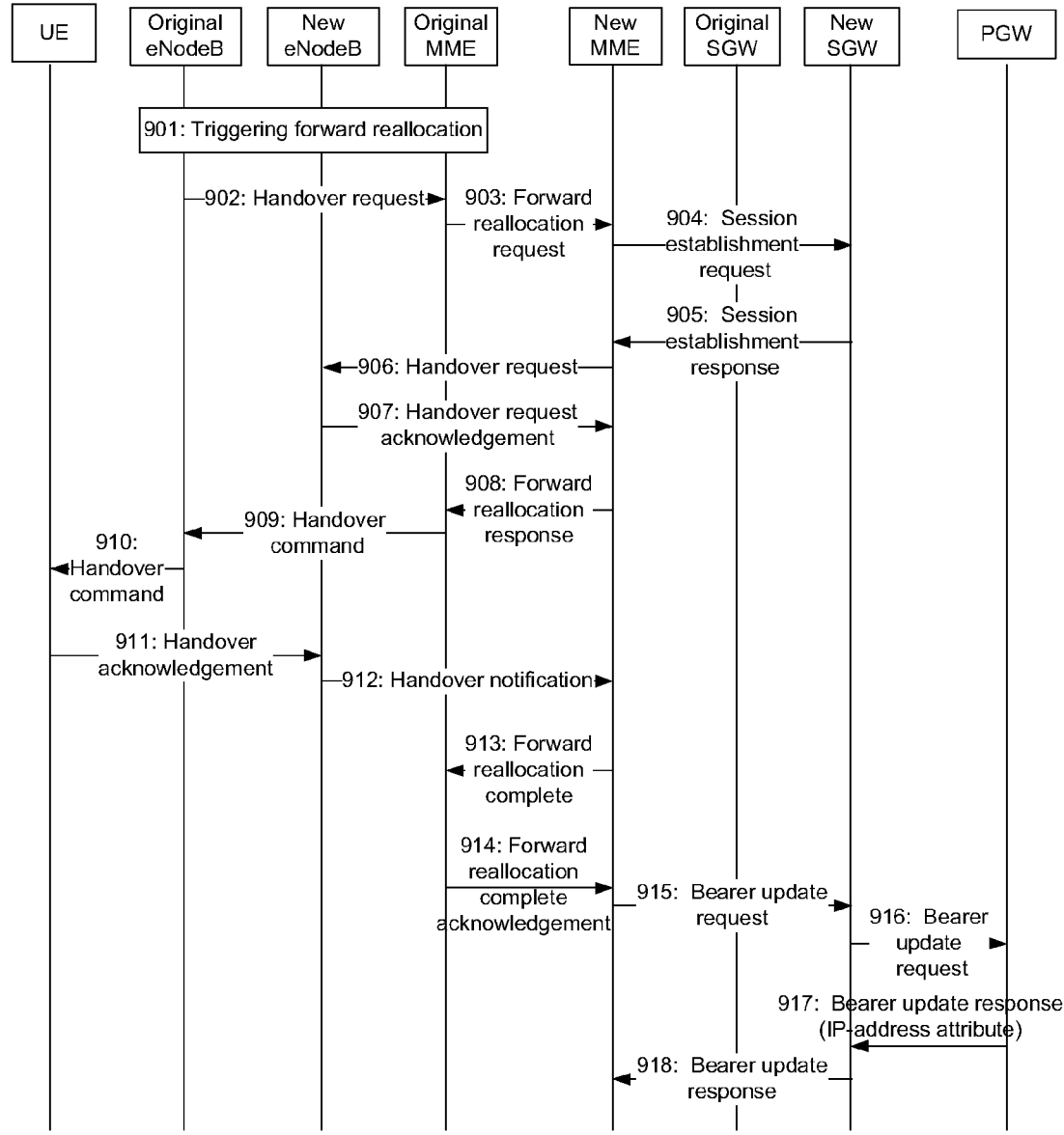
FIG. 9 shows a flowchart of UE experiencing handover and moving to a new MME by the UE according to Embodiment 2 of the disclosure.

Referring to FIG. 9, it shows a flowchart of experiencing handover and moving to a new MME by the UE according to Embodiment 2 of the disclosure. The flow includes the following steps:

Step 901: The original eNodeB decides to initiate a handover between eNodeBs to a new eNodeB which results in the relocation of a core network node.

Step 902: The original eNodeB sends a handover request message to the original MME.

Step 903: The original MME selects a new MME according to an MME selection function, and sends a forward reallocation request message to the new MME. The forward reallocation request message includes an address and a TEID of a PGW for the uplink, and an address and a TEID of an SGW for the uplink.

Step 904: The new MME sends a session establishment request message to the new SGW, and the session establishment request message includes a GTP-C TEID and an IP address of the PGW, bearer QoS etc, and needs to include the attribute of the IP address.

Step 905: The new SGW returns a session establishment response message to the MME, and the session establishment response message includes a GTP-C ITEID and an address of the new SGW.

Step 906: The new MME sends a handover request message to the new eNodeB, so as to request establishment of UE context in the new eNodeB.

Step 907: The new eNodeB sends a handover request acknowledgement message to the new MME.

Step 908: The new MME sends a forward reallocation response message to the original MME.

Step 909: The original MME sends a handover command message to the original eNodeB.

Step 910: The original eNodeB forwards the handover command message to the UE.

Step 911: The UE sends a handover acknowledgement message to the new eNodeB after the UE is synchronized with a cell of the new eNodeB.

Step 912: The new eNodeB sends a handover notification message to the new MME.

Step 913: The new MME sends a forward reallocation complete message to the original MME.

Step 914: The original MME returns a forward reallocation complete acknowledgement message to the new MME.

Step 915: The new MME initiates a bearer update request message to the SGW, and the bearer update request message includes a TEID and an IP address of the new eNodeB for the user plane.

Step 916: The SGW sends a bearer update request message to the PGW, to send to the PGW the address and TEID of the SGW, the location information of the UE and other parameters.

Step 917: The PGW updates its own context and returns a bearer update response message to the new SGW. The message includes the attribute of the IP address. The attribute of the IP address may include a static-IP-address attribute and a dynamic-IP-address attribute, which can be identified by a label. The label may be represented by a separate IE. Specifically, in the IE, "1" can be used to indicate the dynamic-IP-address attribute and "0" can be used to indicate the static-IP-address attribute.

Step 918: The new SGW returns a bearer update response message to the new MME.

The embodiment is illustrated by taking moving to the coverage area of a new MME by the UE as an example. The processing mode for moving to a new SGSN by the UE is similar to the embodiment, which is not repeated here.

In the embodiments above, after the new SGW acquires the attribute of the UE's IP address, a CGF entity connected with the new SGW can charge the UE accurately according to the attribute of the IP address.

Figure 10:
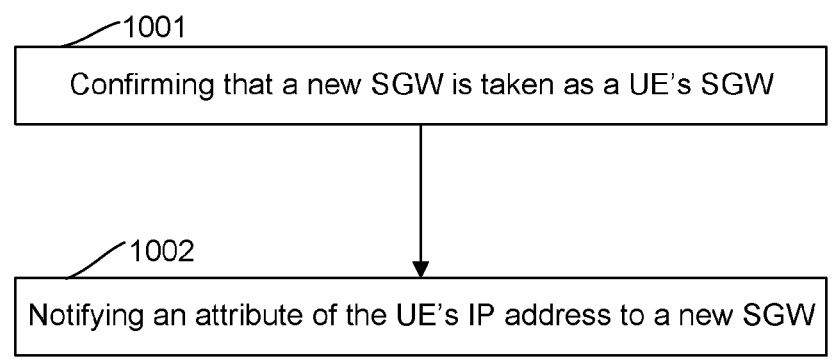
FIG. 10 shows a simple flowchart of notifying an attribute of an IP address according to an embodiment of the disclosure.

From the embodiments above, it can be seen that the operation idea of notifying an attribute of an IP address according to the disclosure can be expressed by the flow shown in FIG. 10. The flow includes the following steps:

Step 1001: It is confirmed that a new SGW is taken as a UE's SGW.

Step 1002: An attribute of the UE's IP address is notified of the new SGW.

Figure 11:
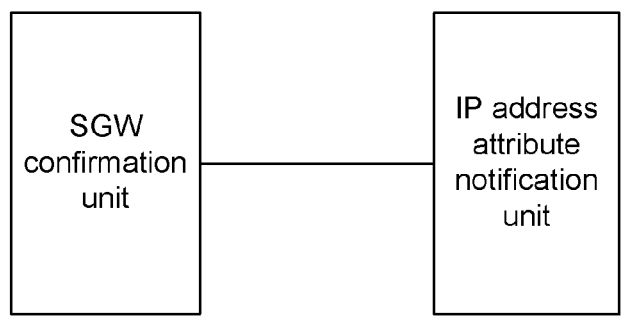
FIG. 11 shows a structure diagram of a system for notifying an attribute of an IP address according to an embodiment of the disclosure.

In order to ensure implementation of the above embodiments and the operation idea, setting can be made as shown in FIG. 11. Referring to FIG. 11, it shows a structure diagram of a system for notifying an attribute of an IP address according to an embodiment of the disclosure. The system includes an SGW confirmation unit and an IP address attribute notification unit that are connected.

During an actual application, the SGW confirmation unit can confirm that a new SGW is taken as a UE's SGW, and notify the IP address attribute notification unit of the confirmed result. The IP address attribute notification unit notifies the new SGW of the attribute of the UE's IP address.

When notifying the new SGW, the IP address attribute notification unit is configured to notify the new SGW by at least one of the following:

controlling a mobility management unit to pass the attribute of the UE's IP address to the new SGW in a session establishment request message; or controlling a PGW to pass the attribute of the UE's IP address to the new SGW, after the UE moves and the new SGW is taken as the UE's SGW.

In the case that the attribute of the UE's IP address is passed to the new SGW by the mobility management unit in the session establishment request message, the mobility management unit is further configured to: acquire the attribute of the IP address during at least one of an attach procedure, a UE-requested PDN connection establishment procedure, and a PDP context activation procedure; and in the case that the attribute of the UE's IP address is passed to the new SGW by the PGW, the PGW is configured to pass the attribute of the IP address in a bearer modification response message.

In addition, in the case that the attribute of the UE's IP address is passed to the new SGW by the mobility management unit in the session establishment request message, the PGW is further configured to pass the attribute of the IP address to the mobility management unit via the new SGW in a session establishment response message; and when the UE moves to the coverage area of a new mobility management unit, the UE's original mobility management unit is configured to pass the attribute of the IP address to the new mobility management unit during a context pass procedure; and in the case that the attribute of the UE's IP address is passed to the new SGW by the PGW, the PGW is further configured to store the attribute of the IP address in a PGW context during at least one of an attach procedure, a UE-requested PDN connection establishment procedure, and a PDP context activation procedure.

The system can further include a CGF entity connected with the SGW, wherein the CGF entity is configured to charge the UE according to the attribute of the IP address.

The attribute of the UE's IP address includes a dynamic-IP-address attribute and a static-IP-address attribute.

The mobility management unit is an MME or an SGSN.

In addition, it can be seen that the SGW in the embodiments of the disclosure can receive an attribute of a UE's IP address. The SGW is one which is newly taken as the UE's SGW.

The attribute of the IP address is passed by the IP address attribute notification unit; and the IP address attribute notification unit is configured to notify the new SGW by at least one of the following:

controlling a mobility management unit to pass the attribute of the UE's IP address to the new SGW in a session establishment request message; or controlling a PGW to pass the attribute of the UE's IP address to the new SGW, after the UE moves and the new SGW is taken as the UE's SGW.

In the case that the attribute of the UE's IP address is passed to the new SGW by the mobility management unit in the session establishment request message, the mobility management unit is further configured to: acquire the attribute of the IP address during at least one of an attach procedure, a UE-requested PDN connection establishment procedure, and a PDP context activation procedure; and in the case that the attribute of the UE's IP address is passed to the new SGW by the PGW, the PGW is configured to pass the attribute of the IP address in a bearer modification response message.

In addition, in the case that the attribute of the UE's IP address is passed to the new SGW by the mobility management unit in the session establishment request message, the PGW is further configured to pass the attribute of the IP address to the mobility management unit via the new SGW in a session establishment response message; and when the UE moves to the coverage area of a new mobility management unit, the UE's original mobility management unit is configured to pass the attribute of the IP address to the new mobility management unit during a context pass procedure; and in the case that the attribute of the UE's IP address is passed to the new SGW by the PGW, the PGW is further configured to store the attribute of the IP address in a PGW context during at least one of an attach procedure, a UE-requested PDN connection establishment procedure, and a PDP context activation procedure.

The SGW is connected with a CGF entity, and the CGF entity is configured to charge the UE according to the attribute of the IP address.

The attribute of the UE's IP address includes a dynamic-IP-address attribute and a static-IP-address attribute.

The mobility management unit is an MME or an SGSN.

To sum up, no matter for the method, the system or the SGW, the technology of notifying an attribute of an IP address in the disclosure can ensure that a new SGW can learn an attribute of a UE's IP address in time when the new SGW is taken as the UE's SGW. Therefore, a CGF entity connected with the new SGW can accurately charge the UE according to the attribute of the IP address.

The above are merely the preferred embodiments of the disclosure, and are not intended to limit the scope of protection of the claims of the disclosure.

The invention claimed is:

1. A method for notifying an attribute of an Internet Protocol (IP) address, comprising:
when a new Serving Gateway (SGW) is taken as a User Equipment's (UE's) SGW, notifying the new SGW of an attribute of the UE's IP address,
wherein the notifying comprises at least one of the following:
passing, by a mobility management unit, the attribute of the UE's IP address to the new SGW in a session establishment request message after the new SGW is taken as the UE's SGW; or
passing, by a Packet Data Network Gateway (PGW), the attribute of the UE's IP address to the new SGW, after the UE moves and the new SGW is taken as the UE's SGW;
wherein the attribute of the UE's IP address comprises a dynamic-IP-address attribute and a static-IP-address attribute.

2. The method according to claim 1, wherein
in the case that the attribute of the UE's IP address is passed to the new SGW by the mobility management unit in the session establishment request message, the method further comprises: acquiring, by the mobility management unit, the attribute of the IP address during at least one of an attach procedure, a UE-requested Packet Data Network (PDN) connection establishment procedure, and a Packet Data Protocol (PDP) context activation procedure; and in the case that the attribute of the UE's IP address is passed to the new SGW by the PGW, the PGW passes the attribute of the IP address in a bearer modification response message.

3. The method according to claim 1, wherein
in the case that the attribute of the UE's IP address is passed to the new SGW by the mobility management unit in the session establishment request message, the method further comprises: passing, by the PGW, the attribute of the IP address to the mobility management unit via the new SGW in a session establishment response message; and when the UE moves to a coverage area of a new mobility management unit, passing, by the UE's original mobility management unit, the attribute of the IP address to the new mobility management unit during a context pass procedure; and
in the case that the attribute of the UE's IP address is passed to the new SGW by the PGW, the method further comprises: storing, by the PGW, the attribute of the IP address in a PGW context during at least one of an attach procedure, a UE-requested PDN connection establishment procedure, and a PDP context activation procedure.

4. The method according to claim 1, wherein the mobility management unit is a Mobility Management Entity (MME) or a Serving General Packet Radio Service (GPRS) Support Node (SGSN).

5. The method according to claim 1, further comprising:
charging, by a Charging Gateway Function (CGF) entity connected with the SGW, the UE according to the attribute of the IP address.

6. A system for notifying an attribute of an Internet Protocol (IP) address, comprising an Serving Gateway (SGW) confirmation unit and an IP address attribute notification unit, wherein
the SGW confirmation unit is configured to confirm that a new SGW is taken as a UE's SGW, and notify the IP address attribute notification unit of the confirmed result; and
the IP address attribute notification unit is configured to notify a new SGW of an attribute of the User Equipment's (UE's) IP address according to the notification of the SGW confirmation unit,
wherein the IP address attribute notification unit is configured to notify the new SGW of the attribute of the UE's IP address by at least one of the following:
controlling a mobility management unit to pass the attribute of the UE's IP address to the new SGW in a session establishment request message after the new SGW is taken as the UE's SGW; or
controlling a Packet Data Network Gateway (PGW) to pass the attribute of the UE's IP address to the new SGW, after the UE moves and the new SGW is taken as the UE's SGW;
wherein the attribute of the UE's IP address comprises a dynamic-IP-address attribute and a static-IP-address attribute.

7. The system according to claim 6, wherein
in the case that the attribute of the UE's IP address is passed to the new SGW by the mobility management unit in the session establishment request message, the mobility management unit is further configured to: acquire the attribute of the IP address during at least one of an attach procedure, a UE-requested Packet Data Network (PDN) connection establishment procedure, and a Packet Data Protocol (PDP) context activation procedure; and in the case that the attribute of the UE's IP address is passed to the new SGW by the PGW, the PGW is configured to pass the attribute of the IP address in a bearer modification response message.

8. The system according to claim 6, wherein
in the case that the attribute of the UE's IP address is passed to the new SGW by the mobility management unit in the session establishment request message, the PGW is further configured to pass the attribute of the IP address to the mobility management unit via the new SGW in a session establishment response message; and when the UE moves to a coverage area of a new mobility management unit, the UE's original mobility management unit is configured to pass the attribute of the IP address to the new mobility management unit during a context pass procedure; and
in the case that the attribute of the UE's IP address is passed to the new SGW by the PGW, the PGW is further configured to store the attribute of the IP address in a PGW context during at least one of an attach procedure, a UE-requested PDN connection establishment procedure, and a PDP context activation procedure.

9. The system according to claim 6, further comprising a Charging Gateway Function (CGF) entity connected with the SGW, wherein the CGF entity is configured to charge the UE according to the attribute of the IP address.

10. The system according to claim 6, wherein the mobility management unit is a Mobility Management Entity (MME) or a Serving General Packet Radio Service (GPRS) Support Node (SGSN).

11. A Serving Gateway (SGW), which is configured to receive an attribute of a User Equipment's (UE's) Internet Protocol (IP) address, wherein
the SGW is one which is newly taken as the UE's SGW, wherein the attribute of the IP address is passed by an IP address attribute notification unit; and the IP address attribute notification unit is configured to notify the new SGW of the attribute of the IP address by at least one of the following:
controlling a mobility management unit to pass the attribute of the UE's IP address to the new SGW in a session establishment request message after the new SGW is taken as the UE's SGW; or
controlling a Packet Data Network Gateway (PGW) to pass the attribute of the UE's IP address to the new SGW, after the UE moves and the new SGW is taken as the UE's SGW;
wherein the attribute of the UE's IP address comprises a dynamic-IP-address attribute and a static-IP-address attribute.

12. The SGW according to claim 11, wherein
in the case that the attribute of the UE's IP address is passed to the new SGW by the mobility management unit in the session establishment request message, the mobility management unit is further configured to: acquire the attribute of the IP address during at least one of an attach procedure, a UE-requested Packet Data Network (PDN) connection establishment procedure, and a Packet Data Protocol (PDP) context activation procedure; and
in the case that the attribute of the UE's IP address is passed to the new SGW by the PGW, the PGW is configured to pass the attribute of the IP address in a bearer modification response message.

13. The SGW according to claim 11, wherein in the case that the attribute of the UE's IP address is passed to the new SGW by the mobility management unit in the session establishment request message, the PGW is further configured to pass the attribute of the IP address to the mobility management unit via the new SGW in a session establishment response message; and when the UE moves to a coverage area of a new mobility management unit, the UE's original mobility management unit is configured to pass the attribute of the IP address to the new mobility management unit during a context pass procedure; and in the case that the attribute of the UE's IP address is passed to the new SGW by the PGW, the PGW is further configured to store the attribute of the IP address in a PGW context during at least one of an attach procedure, a UE-requested PDN connection establishment procedure, and a PDP context activation procedure.

14. The SGW according to claim 11, wherein the SGW is connected with a Charging Gateway Function (CGF) entity, and the CGF entity is configured to charge the UE according to the attribute of the IP address.

15. The SGW according to claim 11, wherein the mobility management unit is a Mobility Management Entity (MME) or a Serving General Packet Radio Service (GPRS) Support Node (SGSN).

* * * * *